United States Patent [19]

Hensiek et al.

[11] 4,309,978
[45] Jan. 12, 1982

[54] FORCED AIR HEATER

[75] Inventors: Charles R. Hensiek, Overland; Paul A. Mutchler, University City; Rayford W. Timms, St. Louis, all of Mo.

[73] Assignee: American Air Filter Company, Inc., Louisville, Ky.

[21] Appl. No.: 150,613

[22] Filed: May 16, 1980

[51] Int. Cl.³ .......................... F24H 3/02; F24H 3/00; F24H 1/00
[52] U.S. Cl. .......................... 126/110 B; 126/116 R; 432/219
[58] Field of Search .............................. 432/219, 220; 126/110 B, 110 C, 110 A, 109 R, 116 R, 89

[56] References Cited
U.S. PATENT DOCUMENTS

| | | | |
|---|---|---|---|
| 2,620,787 | 12/1952 | Zink | 126/110 B |
| 2,647,506 | 8/1953 | Heiman | 126/110 B |
| 3,010,449 | 11/1961 | Owen | 126/116 R |
| 3,711,074 | 1/1973 | Sugg | 432/219 |
| 3,822,691 | 7/1974 | Mutchler | 126/116 R |
| 3,822,991 | 7/1974 | Mutchler | 126/110 B |
| 4,002,157 | 1/1977 | Toesca | 126/116 R |

Primary Examiner—Albert W. Davis
Assistant Examiner—Wesley S. Ratliff, Jr.
Attorney, Agent, or Firm—Thomas G. Anderson

[57] ABSTRACT

A forced air heater for heating a venting air stream including an outer casing, a fan for forcing the venting air stream through the casing, a combustion drum providing a combustion chamber for a burner supported within the casing, a flue gas header spaced downstream from the drum connected in separate fluid communication with the combustion chamber to accommodate evacuation of combustion gases from the chamber through the header, a passage for the venting air stream extending through the casing in heat transfer relation with the drum and header, and a plurality of vanes secured within the casing adapted to circulate a predetermined portion of the venting air stream between said drum and header.

16 Claims, 5 Drawing Figures

FORCED AIR HEATER

BACKGROUND OF THE INVENTION

1. Field of the Invention

This invention relates to forced air heaters and in particular to indirect-fired air heaters for portable personnel shelters and the like.

2. Description of the Prior Art

The prior art includes a variety of indirect-fired air heaters suitable for heating portable personnel shelters, vehicle interiors and related applications.

As shown in U.S. Pat. No. 2,421,370, indirect-fired air heaters generally include an outer casing, a smaller drum enclosing a combustion chamber positioned within the casing to define a plurality of air heating passages extending through the heater between the periphery of the drum and the casing, and a fan secured at one end of the casing suitable for forcing venting air through the heating passages. As shown in the foregoing patent, a fuel burner is positioned at the upstream end of the drum to accommodate the delivery of an axially directed flame into the combustion chamber toward its downstream end whereat the resulting combustion gases are in turn evacuated from the chamber.

When this type of burner is put into operation, the peripheral region of the combustion chamber surrounding the burner is relatively cool compared to its downstream end where the temperature within the chamber is generally in excess of 1100° C. Due to this temperature differential along the length of the combustion drum, only 60–70 percent of its surface area is believed to be effectively utilized to heat the air moving through the casing. Thus, in order to obtain sufficient heat transfer from the drum to the venting air moving through the air heating passages, it has been the practice to provide a series of vanes or baffles at the downstream end of the drum to increase the radiant surface area exposed to the venting air flow about the periphery of the drum, or alternatively, provide a relatively large number of smaller heating passages as in the arrangement shown in the above cited patent. As will be appreciated, both of these approaches result in a substantial pressure drop in the air flowing through the heater as well as being relatively difficult to fabricate and repair. Moreover, while the foregoing arrangements have been for the most part satisfactory when used with lighter fuels such as gasoline, when heavier, slower burning fuels such as diesel oil are used to fire the burner, it is difficult to obtain complete combustion of the fuel. As a result, carbon tends to build up on the walls of the combustion chamber. This in turn leads to corrosion and pitting in the walls which ultimately renders the drum unserviceable requiring its replacement.

In contrast to the foregoing arrangement, U.S. Pat. No. 3,312,212 discloses an indirect-fired office or warehouse heater wherein the combustion gases are evacuated from the combustion chamber at the upstream or burner end of the chamber. As shown in that patent, the combustion gases flow from the chamber through a plurality of tubes connected with a flue gas header which is aligned within the heater downstream from the combustion drum. While this arrangement utilizes a greater percentage of the drum's surface area to heat the venting air flowing through the heater, the necessarily square or rectangular cross-sectional configuration of its combustion drum is relatively bulky, and, without additional reinforcement, less explosion resistant than heaters having a generally cylindrical combustion drum such as that shown in U.S. Pat. No. 2,421,370 noted above.

SUMMARY OF THE INVENTION

The present invention pertains to an apparatus and process for heating a venting air stream and in particular to a relatively lightweight indirect-fired air heater for personnel shelters, vehicle interiors and related uses.

The heater includes an outer casing, a fan adapted to force a stream of venting air through the casing, a combustion drum having a closed downstream end defining a combustion chamber within the casing, a flue gas header vented to the atmosphere spaced downstream from the drum, and a plurality of venting air passages extending through the casing in heat transfer relation with the drum and header. The upstream end of the drum is enclosed by an end wall having an opening in which a burner is supported to deliver an axially directed flame of combustion products toward the closed downstream end of the drum, and a plurality of discharge ports are provided in the upstream end of the drum which open into a corresponding plurality of combustion gas ducts connected with the header to accommodate evacuation of the combustion gases from the chamber to the atmosphere. As will be described, this arrangement reverses the combustion gas flow at the downstream end of the combustion chamber to form an annular flow of hot combustion gases about the flame moving toward the discharge ports at the upstream end of the chamber. As a result, substantially the entire length of the drum is effectively utilized to heat the venting air as it is forced through the heater. Moreover, the circulating flow of the gases between the ends of the combustion chamber promotes recirculation of unburnt fuel within the chamber until complete combustion is achieved, while at the same time retarding the development of corrosive carbon deposits within the chamber.

The invention also contemplates stabilizing the temperature of the combustion gases as they are discharged fom the heater into the atmosphere. This is accomplished by circulating a predetermined portion of the venting air flowing through the heater between the combustion drum and the flue gas header to effect a thermal buffer which retards reheating of the combustion gases in the header prior to their discharge to the atmosphere while at the same time augmenting heat transfer from the drum to the venting air stream.

While the heater is preferably on an easily fabricated, lightweight sheet metal construction, it is to be understood that various changes can be made in the arrangement, form and scope of the present disclosure without departing from the nature and spirit of the invention.

DESCRIPTION OF THE PREFERRED EMBODIMENT

Figure 1:
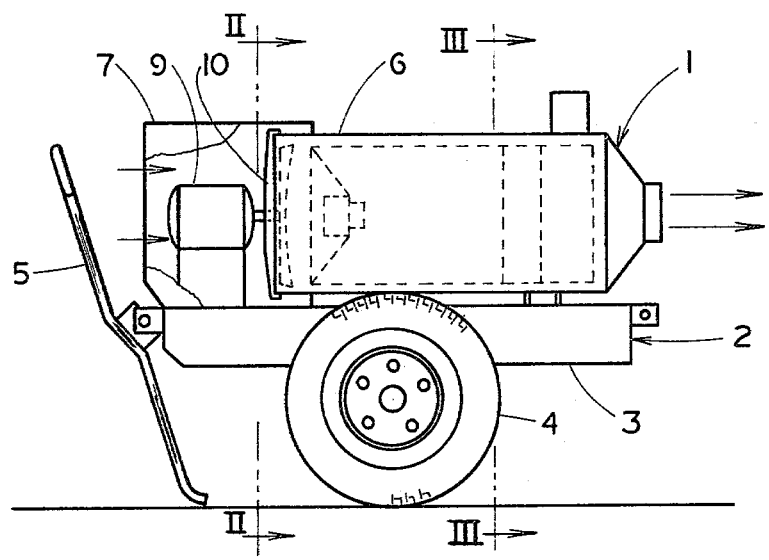
FIG. 1 is a side elevational view, partially in section, of a forced air heater embodying the invention.
Figure 2:
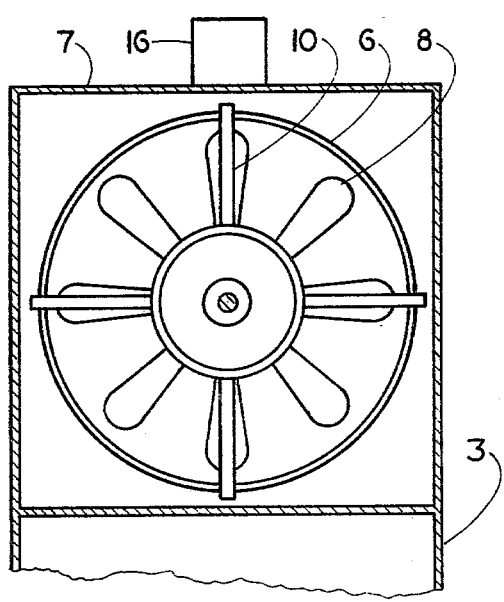
FIG. 2 is an enlarged cross-sectional view of the heater taken substantially along line II—II in FIG. 1.

As shown in the drawings, the forced air heater 1 is preferably of a welded sheet metal construction carried on a trailer 2. The trailer 2 includes a base portion 3 which also serves as a fuel tank and is normally supported in a horizontal position by a pair of wheels 4 and a movable handle or towbar 5 such as that shown in U.S. Pat. No. 4,063,750. The heater 1 includes an outer cylindrical casing 6, open at both ends, which is mounted upon the base 3 and has its upstream end joined to a motor cowling 7 which is similarly mounted on the base 3. As illustrated by the arrows shown in FIG. 1, venting air to be heated is drawn into the cowling 7 and forced through the casing 6 by an axial flow fan 8 driven by a motor 9, it being noted that the fan 8 is supported for rotation within the upstream end of the casing 6 by a spider-like bracket 10 secured to the end of the casing 6.

Figure 3:
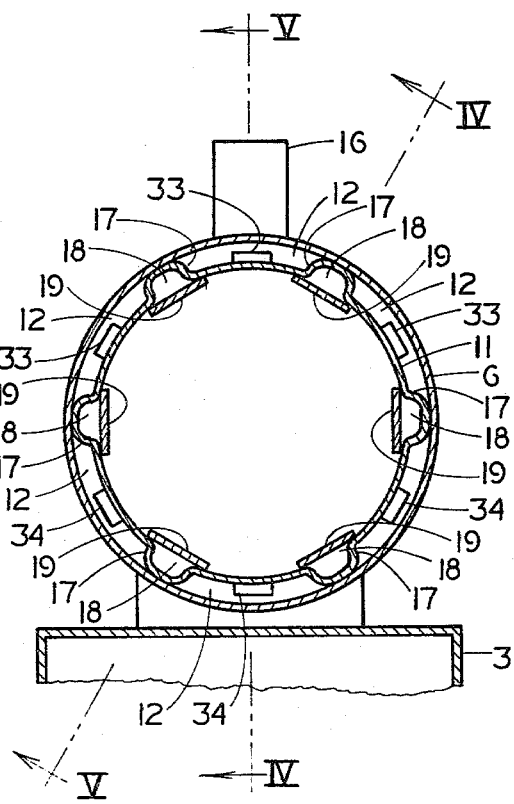
FIG. 3 is an enlarged cross-sectional view of the heater taken substantially along line III—III in FIG. 1.
Figure 4:
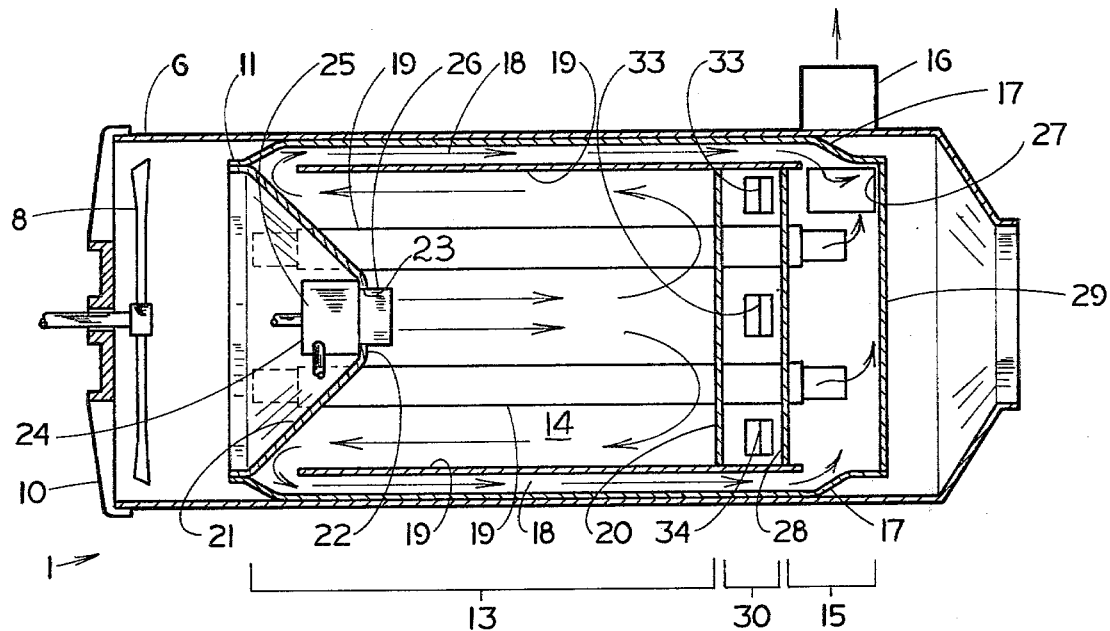
FIG. 4 is a cross-sectional view taken generally along line IV—IV in FIG. 3 schematically showing the flow of combustion gases through the heater.
Figure 5:
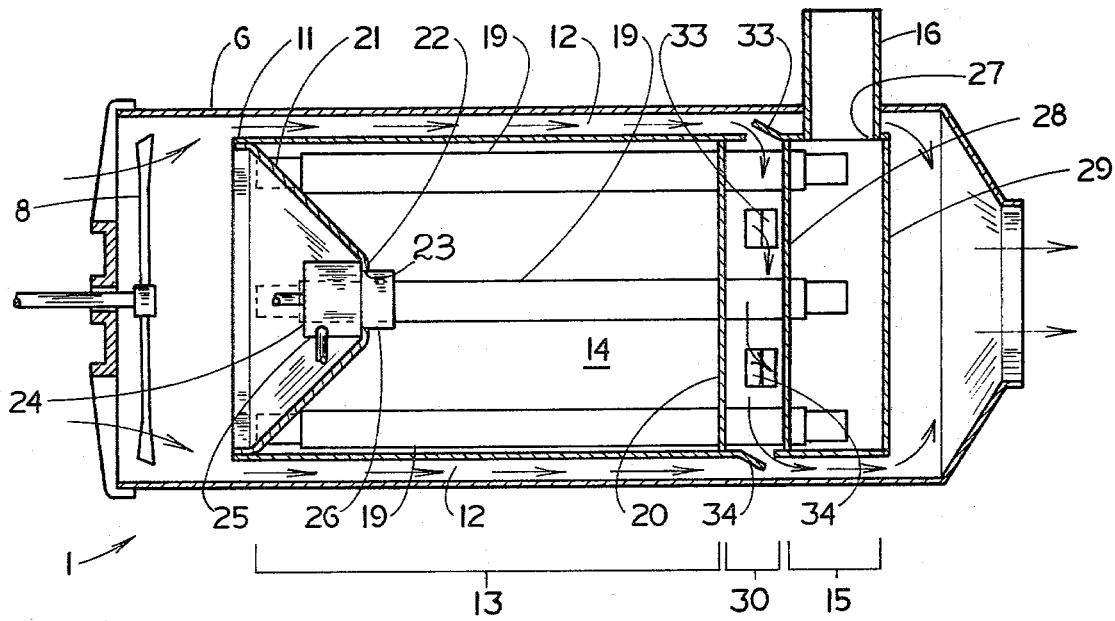
FIG. 5 is a cross-sectional view taken generally along line V—V in FIG. 3 schematically showing the flow of venting air through the heater.

As best shown in FIGS. 3-5, a cylindrical shell 11 of shorter length and lessor diameter than the casing 6 is coaxially supported within the casing 6 to form a plurality of air passages 12 extending through the casing 6 about the periphery of the shell 11. The shell 11 forms a common circumferential wall for a combustion drum 13 forming a combustion chamber 14 and a flue gas header 15 through which combustion gases in the chamber 14 are vented to the atmosphere via a tubular stack 16. As shown in FIG. 3, a plurality of outwardly protruding channel portions 17 are symmetrically formed in the shell 11 about its circumference. The channel portions 17 extend along substantially the entire length of the shell 11 and slidingly engage the casing 6 to retain the shell 11 in concentrically spaced relation with the casing 6 to define the passages 12, and as will be described, the interior of each channel is enclosed by an elongated plate 19 to provide a plurality of separate exhaust ducts 18 about the periphery of the shell 11 between the passages 12. Although the channel portions 17 shown in the drawings are of a generally U-shaped cross-sectional configuration, the invention also contemplates forming the channels in a W-like cross-sectional shape by rolling or other well known metal forming methods to further rigidify the shell 11 as well as minimize direct heat conduction through the channel portions to the outer casing 6. Additionally, while in the preferred embodiment the shell 11 is shaped to form the exhaust ducts 18, a plurality of channel shaped members opening into the combustion chamber and the interior of the header through ports in the shell can be affixed along the length of the shell in lieu of the channel portions 17.

As shown in FIGS. 4 and 5, the downstream end of the combustion drum 13 is enclosed by a plate or firewall 20 secured across the interior of the shell 11. The upstream end of the combustion drum is enclosed by a generally convex or frustoconically-shaped end wall 21 coaxially aligned with the longitudinal axis of the drum. The end wall 21 includes an annular rim portion 22 defining a centrally disposed opening 23 in which a burner 24 is positioned to accommodate delivery of an axially directed flame or jet of combustion products into the chamber 14 toward the firewall 20 as schematically shown by the arrows in FIG. 4. The burner 24, which preferably should have a relatively high flame velocity in the range of about 20-30 meters per second such as the burner shown in U.S. Pat. No. 3,364,968, includes a burner housing 25 secured to the end wall 21 and a nozzle 26 extending generally coaxially into the combustion chamber 14, it being noted that the burner housing includes one or more openings (not shown) adapted to meter a flow of venting air into the housing which in turn supports the combustion process within the combustion chamber.

During operation of the burner, the throw or momentum of its flame directs an axial flow of combustion products toward the firewall 20. This flow reverses as it approaches the firewall to form an annular flow of combustion gases surrounding the flame moving toward the upstream end of the combustion chamber. These gases are in turn evacuated from the chamber via the exhaust ducts 18, each of which opens into the chamber through an associated discharge port in the shell spaced upstream from the discharge orifice of the burner nozzle. This arrangement has been found to be particularly desirable since the generally frustoconically-shaped end wall 21 tends to direct or funnel combustion gases into the discharge ports so as to substantially reduce the possibility of combustion gases being blown back into the venting air stream through the air supply ports in the burner housing when the burner is ignited. Moreover, testing has indicated that the slower burning fuels such as diesel oil as well as the faster burning fuels similar to gasoline can be efficiently used to fire the heater since it promotes recirculation of unburnt fuel within the combustion chamber until complete combustion is obtained. This is believed to occur as a result of the unburnt fuel particles being continually drawn from the annular flow into the flame and recirculated toward the firewall 20 until complete combustion is achieved. The reversal and recirculation of combustion gases also abates the development of carbon deposits which experience has shown can lead to pitting and corrosion of the walls of the chamber. In particular, the annular flow of the combustion gases maintains the peripheral region of the combustion chamber in excess of 550° C. along substantially the entire length of the chamber. Since carbon in the combustion gases generally will not adhere to the walls of the chamber at such temperatures, pitting and corrosion due to carbon buildup is thereby essentially eliminated.

As noted above, the flue gas header 15 is aligned within the casing downstream from the combustion drum 13. The downstream end of the shell 11 forms the outer circumferential wall of the header 15 and a pair of axially spaced header plates 28 and 29 secured across the interior of the shell 11 enclose its ends. As shown in the drawings, the exhaust ducts 18 connect the combustion chamber 14 in separate fluid communication with the interior of the header 15 which is in turn vented to the atmosphere through the outlet 27 opening into the tubular stack 16 extending through the wall of the casing. It should be particularly noted that the header 15 is spaced downstream from the firewall 20 to provide a transverse passage or chamber 30 through which a predetermined portion of the venting air stream can be circulated during operation of the heater as schematically indicated by the arrows in FIG. 5. As shown in that drawing, the venting air is directed through a plurality of diametrically opposed venting ports symmetrically disposed about the shell 11 by opposing baffles or vanes 33 and 34 extending from the shell into the air passages 12 toward the upstream and downstream ends of the shell, respectively. The resulting stream of venting air moving through the chamber 30 effects a thermal buffer between the firewall 20 and the upstream header plate 28 which retards reheating of combustion gases passing through the header while at the same time augmenting heat transfer to the venting air moving through the heater. By way of illustration, in a test of a heater wherein the vanes 33 and 34 extended across approximately 25 percent of the total cross-sectional area of the passages 12, the temperature of the combustion gases being discharged to the atmosphere from the header 15 was maintained at about 480° C. while the temperature of the gases in the combustion chamber near the firewall was in the range of 1100°–1450° C. Simultaneous measurement of the venting air temperatures within the heater indicated that as the diverted portion of the venting air moved through the chamber 30 it was heated to approximately 200° C. by the time it re-entered the main stream of venting air on the opposite side of the shell whereafter the venting air stream was ultimately discharged from the heater at approximately 140° C. or about 125° C. above the ambient temperature of the test facility. In contrast, a test of a heater similar to the foregoing arrangement, except that it did not include any provision for circulating venting air between the combustion drum and the header, resulted in combustion gases being discharged to the atmosphere at temperatures in the range of 550°–650° C.

The embodiments of the invention in which an exclusive property or privilege is claimed are defined as follows:

1. A process for heating a stream of venting air in an indirect-fired heater having a combustion drum enclosing a combustion chamber and a flue gas header vented to the atmosphere spaced downstream from the drum, comprising:
    directing a flame of combustion products toward the closed downstream end of the combustion chamber while evacuating said gases from the peripheral region of the chamber at the upstream end of the drum to effect a reverse flow of combustion gases surrounding the flame within the chamber at the upstream end of the combustion chamber;
    conducting said gases in separate fluid communication to the header from the upstream end of the combustion chamber for discharge to the atmosphere as they are evacuated from the chamber;
    forcing the venting air stream through the heater in heat transfer relation along the length of the drum and header; and
    diverting a predetermined portion of the venting air from said stream and circulating it between the drum and header to retard reheating of the combustion gases prior to discharging them to the atmosphere whereafter said portion is returned to the venting air stream.

2. A forced air heater, comprising:
    an outer casing;
    an axial flow fan in said casing for forcing venting air through the casing;
    a combustion drum within the casing downstream from said fan;
    said drum having a closed downstream end and an upstream end wall enclosing the upstream end of the drum to define a combustion chamber within the drum; and
    said end wall being of a generally frustoconic configuration including a central annular rim portion defining an opening through said wall;
    burner means supported in said opening by said rim portion adapted to deliver an axially directed jet of combustion products into the chamber toward the downstream end of the drum;
    a flue gas header aligned within the casing downstream from said drum;
    stack means venting the interior of said header to the atmosphere;
    duct means connected with said header opening into the combustion chamber through the upstream end of the drum to provide separate fluid communication between the chamber and the interior of the header; and
    spacing means supporting said drum and header in generally concentrically spaced relation with said casing to provide at least one passage for directing venting air through the heater.

3. The heater according to claim 2, and said burner means being adapted to deliver a jet of combustion products having a flame velocity in the range of approximately 20–30 meters per second.

4. The heater according to claim 2, and said duct means being generally symmetrically disposed about the circumference of said drum in substantially uniform heat transfer relation with said passage means.

5. The heater according to claim 2, and
    a tubular shell forming a common circumferential wall for said drum and header.

6. The heater according to claim 5, and
    said venting means including at least one pair of venting ports in said shell disposed in diametrically opposed relation between said drum and header; and
    vane means proximate the venting ports adapted to direct a portion of the venting air stream into one of said ports and aspirate said portion from the other of said ports.

7. The heater according to claim 6, and
    said vane means including at least one pair of baffles on said shell adapted to protrude into the venting air stream, one of said baffles extending upstream from the downstream side of one of the venting ports and the other of said baffles extending downstream from the upstream side of its opposing venting port.

8. The apparatus according to claim 6, and
    said vane means including baffle means adapted to extend across approximately 25 percent of the total cross-sectional area of the venting air stream within said passage means.

9. The heater according to claim 5, and
    said duct means including a plurality of channel-shaped members spaced about the periphery of said shell; and
    each of said members extending along the length of the shell and being affixed thereto to form an elongated duct opening through the shell into the combustion chamber and the interior of the header.

10. The heater according to claim 9, and
    said channel-shaped members being generally symmetrically disposed about the circumference of said shell.

11. The heater according to claim 5, and said shell including portions shaped to define a plurality of axially extending channels spaced about the periphery of said shell; and a corresponding plurality of elongated plates, each of said plates substantially enclosing a respective channel to form a duct opening into the combustion chamber and the interior of the header to provide said duct means.

12. The heater according to claim 11, and said portions defining said channels protruding outwardly in supportive engagement with said casing.

13. The heater according to claim 2, and said duct means opening into the combustion chamber through a plurality of openings in the drum spaced upstream from said annular rim portion.

14. The heater according to claim 2, and a tubular shell providing a common circumferential wall for said drum and header;

a pair of axially spaced plates secured across the interior of the shell proximate its downstream end enclosing the interior of the header;

a firewall spaced upstream from the header secured across the interior of the shell to form the closed downstream end of the drum; and said end wall being secured across the upstream end of the shell to enclose the combustion chamber within the shell.

15. The heater according to claim 14, and said shell having a plurality of venting ports between the firewall and the header accommodating the circulation of venting air between the drum and header to abate reheating of combustion gases in the header during operation of the heater.

16. The heater according to claim 14, and said stack means rigidly interconnecting said shell with the casing; and said spacing means protruding outwardly from the shell in sliding supportive engagement with the casing to accommodate relative movement between the shell and casing.

* * * * *